United States Patent Office 2,850,358
Patented Sept. 2, 1958

2,850,358

RECOVERY OF IRON, ALUMINUM, AND PHOSPHATE VALUES FROM LEACH ZONE MATERIAL

David H. Reeve, Chicago, Ill., assignor, by mesne assignments, to the United States of America as represented by the United States Atomic Energy Commission No Drawing. Application May 27, 1955
Serial No. 511,755

3 Claims. (Cl. 23—123)

The instant invention relates to the processing of phosphorus-bearing aluminiferous ores. More particularly, it relates to the recovery of $P_2O_5$ values normally lost in precipitates consisting predominantly of iron phosphate and aluminum phosphate produced when processing so-called leached zone material of the overburden from the phosphate matrix found in the Florida pebble phosphate fields.

Leached zone material is found as a distinct layer between the top cover of humus, sand and clay and the phosphate matrix in the Florida pebble phosphate fields. This material consists largely of a silty to clay-like sand containing components of aluminum, iron, phosphorus and minor values, together with other clays and slimes.

This leached zone material while not a true clay exhibits a porous and generally soft, pliable structure. Mineralogically it consists of quartz, wavellite and perhaps pseudo-wavellite as the major phases. Chemically, it is considered to be a mixture of hydrated aluminum and calcium aluminum phosphate with fine quartz, iron oxide, compounded fluorine and some clay. Also there may be some unleached and partially leached tricalcium phosphate. The folowing analyses of leached zone material was obtained by averaging analyses obtained from about 200 drill core samples procured over an area of about 36 square miles. The leached zone material averages as follows:

| | Percent |
|---|---|
| $P_2O_5$ | 8.7 |
| $Al_2O_3$ | 8.7 |
| CaO | 6.4 |
| Acid insolubles | 68.7 |

Since the vast percentage of the acid insoluble material is quartz and since it is a coarser particle size than the other materials contained in the material being mined, it has been found advantageous, but not necessary to the invention, to split the ore after suitable comminution, if desired, into one fraction of small particles and another fraction of coarser particles, the split being made at from about 150 mesh up to about 220 mesh after the material has been slurried with water. The fraction containing the particles smaller than this is the valuable fraction, while the fraction containing the particles larger than this is the fraction which is for the most part quartz and is discarded.

In the processing of unsized or sized leached zone material for recovery of the phosphate values, the material with or without a preliminary calcining operation has been digested with various mineral acids such as sulfuric acid or nitric acid or with acid salts such as ammonium bisulfate. While solubilizing of leached zone constituents can be accomplished by reacting material to form the counterpart of superphosphate and leaching the mixture with water, it is generally preferred to carry out a reaction whereby a slurry is formed having the water soluble reaction products in the liquid phase.

In the prior processes, the aluminum constituents of the liquid phase or aqueous extract have been precipitated by adding to the solution ammonium sulfate. The alum or ammonium aluminum sulfate precipitated by reaction with ammonium sulfate removes about 70%–80% of the aluminum present in the solution and about 1% of the phosphate. The resultant solution contains about all of the iron, about 99% of the phosphate and about 20%–30% of the aluminum initially present in the aqueous solution. This resultant solution when processed to remove iron and aluminum has always given a product tying up about 70% of the phosphate present in the treated solution, leaving only about 30% of the $P_2O_5$ values for recovery in a useful form, for example, as ammonium phosphate.

It is a primary object of this invention to provide a method which overcomes the shortcomings and disadvantages of processes heretofore in use.

It is another object of this invention to provide a method wherein about 90% of the $P_2O_5$ content of the extract solution is recovered as a useful phosphate.

It is a further object of this invention to provide a method for the recovery of constituents of low economic value fertilizer or waste material precipitates such as iron phosphate and aluminum phosphate in forms having greater economic value.

These and other objects of the invention will be apparent from the following description.

Briefly, the invention comprises digesting iron phosphate and aluminum phosphate precipitates from solution containing the solubilized constituents of leached zone material with concentrated sulfuric acid, eliminating water when necessary, crystallizing iron and aluminum sulfates, separating the crystallized material from the predominantly sulfuric acid-phosphoric acid solution mixture and heat treating the crystalline material at temperatures decomposing the sulfates to recover the iron and aluminum in the oxide form.

More in detail as applied to a preferred embodiment of the invention, the small particle size fraction of leached zone material obtained by splitting the solids at a size of approximately 200 mesh with or without a preliminary calcining treatment is solubilized by reaction with an acid such as sulfuric acid, sulfur dioxide or equivalent materials. In a typical reaction a 200 mesh size fraction in aqueous slurry form having a solids content in the range between about 30% and about 60% is reacted with the sulfuric acid at temperatures in the range between about 60° C. and about 90° C.

Preferably, the digestion is carried out for a period of time ranging between 0.2 and about 6 hours and still more specifically, for a period of about 30 minutes to about 60 minutes, although the length of time may be varied considerably depending upon other variations in reaction conditions. The interdependence of variables makes for vast differences in the specific conditions employed as to each variation. In general, it may be stated the higher the percent acidulation used, the lower the time required. Thus, for example, if about 70% acidulation is used, i. e., about 106.5 pounds of 96% sulfuric acid per 100 pounds of leached zone material, only about 15 minutes is required to accomplish the digestion, while at about 45% acidulation, about 6 hours digestion is necessary to give good recovery of the desired constituents. Depending upon the analysis of the particulr leached zone material processed, between about 30% and about 105% acidulation is desired. This corresponds to the addition of between about 50 pounds and about 150 pounds of sulfuric acid per hundred pounds of leached zone material processed. Preferably, about 70% acidulation is used. The percent acidulation referred to in this description is calculated on the basis of the reaction of sulfuric acid with all of the iron, aluminum and calcium, or other significant cationic constituents present in the leached zone material. In other words, 100% acidulation would be the addition of that amount of sulfuric acid required to completely react with these components.

After digestion, the aqueous solution of reaction products is separated from the insolubles such as quartz. The solids-free solution is then treated in one of two ways. The solids-free solution may be treated directly with ammonia to precipitate all of the iron and aluminum as iron phosphate and aluminum phosphate. The solution may also be treated with ammonium sulfate to precipitate ammonium aluminum sulfate or so-called alum. This precipitation will remove a major portion of the aluminum from solution. After separating the precipitated ammonium alum solids, the solution may be treated with an ammonium reactant, such as gaseous ammonia, ammonium hydroxide, ammonium carbonate and the like.

Upon adjustment of the solution to a pH in the range between about 3.0 and about 7.0, a precipitated product comprising predominantly iron phosphate and aluminum phosphate is formed. The precipitated material is separated from solution comprising predominantly ammonium phosphate and ammonium sulfate. This amorphous cake is separated from the solution by, for example, filtration and is used for further processing either in a wet or dry form. Material is digested with concentrated sulfuric acid. Wet crystalline material carries with it anywhere from 20 to as much as 50% by weight of water. If wet precipitated material is digested, its water content is preferably eliminated by adding oleum to the digest solution. When iron and aluminum, now in the sulfate form, begin to to crystallize from the sulfuric acid solution, the solution is heated to a temperature in the range between about 150° C. and about 200° C. for a period of between about 20 minutes and about 90 minutes. Any calcium present in the solution is thrown down as calcium sulfate. The crystallized material is separated from solution by filtering or equivalent operation, leaving a solids-free solution containing predominantly sulfuric acid and phosphoric acid in a weight ratio of the order of 3.5:1 with between about 90% and about 95% of the $P_2O_5$ recoverd in solution.

Iron sulfate and aluminum sulfate crystals are calcined in suitable equipment such as a rotary kiln to decompose the sulfate solids. Sulfur dioxide and sulfur trioxide gases evolved are suitably processed to convert them to sulfuric acid and oleum mediums for reuse in the process. The sulfuric acid-phosphoric acid mixture may be used in the preparation of monocalcium phosphate solution by reaction with phosphate rock and the phosphoric acid recovered as a calcium phosphate.

When digesting the aluminum and iron phosphate material, quantities of sulfuric acid are utilized which vary according to the nature of the subsequent processing intended. If addition of oleum is contemplated, approximately stoichiometric reaction quantities based upon 98% sulfuric acid are utilized. If no addition of oleum is contemplated, then a minimum of about 150% of the stoichiometric equivalent amount of sulfuric acid for complete reaction is used. In general, it is preferred to operate the digestion in the presence of between about 40% and about 300% excess of sulfuric acid over the stoichiometric amount required for reaction. When using quantities of sulfuric acid which give an approximately 1:1 weight ratio of sulfate to phosphate, i. e., the stoichiometric equivalent amount for reaction, crystals of iron and aluminum sulfate formed have a small particle size, are more difficult to handle, and contain sufficient phosphate to constitute appreciable $P_2O_5$ losses. It is preferred to digest precipitates using quantities of sulfuric acid giving a weight ratio of sulfate to phosphate of about 2:1 or higher. Optimum crystallization conditions as measured by particle size and lack of phosphate contamination in the iron and aluminum sulfate is obtained when the digest is carried out by adding sulfuric acid in quantities to give a weight ratio of sulfate to phosphate in the range between about 2.6:1 and about 3.0:1.

When oleum is to be added, smaller quantities of sulfuric acid can be used initially but acid concentration at the time of crystallizing iron and aluminum sulfates should be in the range between about 2:1 and about 9:1, preferably in the range between about 2.5:1 and about 4:1.

For desirable crystallization it is necessary that the solution obtained from the digestion be reduced in water content to less than about 8% by weight. Reduction may be accomplished by adding oleum or by removing water through a process step such as evaporation. In general, the quantity of water present will be dependent upon the water content of the precipitate being digested. It is preferred, therefore, but not necessary to the operability of the process that the cake be at least partially dried. Water is eliminated by evaporation. Temperatures for evaporation generally will be maintained in the range between about 150° C. and about 250° C.

Crystals of iron and aluminum sulfate will form in hot concentrated sulfuric acid solution at temperatures of the order of 192° C. Because of the difficulty in filtering or otherwise separating crystals from hot sulfuric acid solutions, the digest solutions generally are cooled. The temperature of filtration may be as low as room temperature, but in the interest of speed of processing the solutions generally are cooled to temperatures in the range between about 25° C. and about 100° C.

The recovered iron and aluminum sulfate crystal mixture is heat treated to convert the metallic sulfates to the oxide form. Iron sulfate when pure decomposses at about 480° C. Aluminum sulfate when pure decomposes at about 770° C. Variations in decomposition temperatures occur due to impurities. The complete decomposition operation may be carried out in one stage at a temperature in the range between about 800° C. and about 1400° C., preferably at a temperature between 900° C. and about 1100° C. However, under certain conditions the decomposition may be carried out stepwise, heat treatment in the first stage being at temperatures between about 500° C. and about 650° C. In such a type operation, the partially decomposed material generally is leached to remove substantial quantities of aluminum sulfate which aluminum sulfate can then be recovered from the leached solution and independently decomposed at temperatures in the above mentioned range between about 800° C. and about 1400° C.

Sulfur dioxide and sulfur trioxide gases thrown off in the heat treatment of the iron and aluminum sulfate crystals may be recovered according to standard procedures currently in use in the manufacture of sulfuric acid.

The invention will be further understood from the following example which is given by way of illustration and without any intention that the invention be limited thereto.

*Example*

A representative leached zone feed assaying 15.2% $P_2O_5$, 23.2% $Al_2O_3$, 2.7% $Fe_2O_3$, 9.1% CaO, as an approximately 30% solids slurry in water is mixed with 96% sulfuric acid at approximately 1.0 pounds of dry solids per pound of acid and autoclaved at 200 pounds per square inch pressure at a temperature of about 390° F. for one hour. The resulting mass was cooled and leached countercurrently with water to recover solubilized constituents and the insoluble cake discarded. Approximately 1.6 pounds of water per pound of dry leached zone feed was used in the countercurrent extraction of the solubilized values from the digestion. An average filtration rate throughout the countercurrent leaching operation of approximately 7 pounds of dry solids per square foot per hour was obtained. The resultant extract at approximately 1.3 specific gravity assayed approximately 4.7% $P_2O_5$, 6.6% $Al_2O_3$, 0.3% $Fe_2O_3$, and approximately 15.9% sulfate. Overall recoveries in the digesting and leaching circuits were approximately 89% $P_2O_5$, 81% $Al_2O_3$ and 81% $Fe_2O_3$. To this extract when at a temperature of 60° C. is added approximately 0.14 pound ammonium acid sulfate and 0.08 pound ammonium sulfate per pound of extract and the mixture cooled to approximately 20° C. to crystallize the material substantially as ammonium aluminum sulfate, also known as crude ammonium alum. This crystallized alum on a dry basis analyzes approximately 10.5% $Al_2O_3$. 38.4% sulfate, 4% ammonia, 44.8% chemical water, 0.3% $P_2O_5$, about 48.2 pounds of wet crystals, 5% moisture, are recovered per 6.57 pounds of $Al_2O_3$ in the liquor from the leached mineral digest.

The aqueous phase was then processed as follows: to 100 pounds of liquor is added approximately 18.2 pounds of 28% ammonium hydroxide to adjust the pH range of the aqueous phase to approximately 7, the solids formed removed from solution, washed with water and the recovered material assayed approximately 14.9% $Al_2O_3$, 24.6% $Fe_2O_3$, and 42.1% $P_2O_5$ on a dry basis. The resulting liquor may be treated with ammonium hydroxide to precipitate triammonium phosphate or any other suitable method for recovery of the $P_2O_5$ values left in the liquor.

1,000 parts by weight of dry solids of this precipitated material recovered by filtration processed as wet cake having a moisture content of approximately 15%, was mixed with approximately 360 parts by weight of 96% sulfuric acid. The water content of the digest solution was approximately 12.1% by weight. This water was eliminated by adding to the digest solution approximately 200 parts by weight of oleum. The solution was then heated to approximately 190° C. and held at that temperature for approximately 1 hour, following which the solution was cooled to approximately 90° C. Crystals of iron and aluminum sulfate were removed from the digest liquor by filtering. The filtrate from this operation analyzed:

| | Percent |
|---|---|
| $P_2O_5$ | 17 |
| $SO_4$ | 75.5 |
| $P_2O_5$ recovery | 90 |
| $Al_2O_3$ | 0.4 |
| $Fe_2O_3$ | 0.2 |

The filtered crystals analyzed as follows:

| | Percent by weight |
|---|---|
| $P_2O_5$ | 9.3 |
| $Al_2O_3$ | 15.2 |
| $Fe_2O_3$ | 4.2 |
| $SO_4$ | 68.4 |
| $H_2O$ | 2.3 |

The crystals were heat treated in a muffle furnace at a temperature of approximately 1000° C. for ¾ of an hour. The resultant solids analyzed as follows:

| | Percent by weight |
|---|---|
| $P_2O_5$ | 31.5 |
| $Al_2O_3$ | 51.0 |
| $Fe_2O_3$ | 14.1 |
| $SO_4$ | 3.0 |

It will be apparent from the above example that approximately 90% of the phosphate content of the iron and aluminum phosphate precipitate is recovered in the filtrate analyzing 17% $P_2O_5$. The above example treated the iron and aluminum phosphate precipitate with a sulfate reaction approaching the minimum. With higher sulfate quantities as for example when digesting precipitate with equal weights of reactants, greater phosphate recovery is attained in the filtrate and the $P_2O_5$ content of the filtered crystals of iron and aluminum sulfate is reduced to the order of about 1% by weight as compared to the 9.3% shown in the example.

Having thus described my invention, what I claim is:

1. A method of recovering phosphorus components of iron and aluminum phosphates obtained by precipitation from acidic solutions containing the water soluble products of the reaction of sulfuric acid with phosphorus-bearing material, which comprises digesting leached zone material with aqueous sulfuric acid, separating insoluble solids from the aqueous solution of reaction products, adjusting the pH of said solution with a basic oxygen-bearing compound whereby predominantly iron and aluminum phosphate precipitates are formed, digesting the iron and aluminum phosphates with concentrated sulfuric acid solution, adjusting the sulfate to phosphate weight ratio in the range of between about 2:1 and about 9:1 to reduce the water content to less than about 8% by weight whereby the solution is rendered supersaturated with respect to iron sulfate and aluminum sulfate, heating the supersaturated solution upon initiation of metal sulfate crystallization to a temperature in the range between about 150° C. and about 250° C., crystallizing and separating the iron and aluminum sulfates from the supersaturated solution and recycling the solids-free solution of sulfuric and phosphoric acids to the leached zone material-sulfuric acid digestion step.

2. A process as in claim 1 wherein the sulfate to phosphate weight ratio is adjusted to between about 2.6:1 and about 3:1 by adding oleum to the digested solution.

3. A method of recovering phosphorus components of iron and aluminum phosphates obtained by precipitation from acidic solutions containing the water soluble products of the reaction of strong acids with phosphorus-bearing material, which comprises digesting leached zone material with aqueous solution of strong acid, separating insoluble solids from aqueous solution of reaction products, adjusting the pH of said solution whereby predominantly iron and aluminum phosphate precipitates are formed, digesting the iron and aluminum precipitate with concentrated sulfuric acid solution, adjusting the sulfate to phosphate concentration to give a weight ratio of sulfate to phosphate in the range of between about 2:1 and about 9:1, reducing water to less than about 8% by weight whereby the solution is rendered supersaturated with respect to sulfate salts of iron and aluminum, crystallizing from the supersaturated solution the sulfate salts of iron and aluminum, separating the crystallized salts and recirculating the solids-free solution of sulfuric acid and phosphoric acid to the step wherein leached zone material is treated with strong acid.

References Cited in the file of this patent

UNITED STATES PATENTS

| | | |
|---|---|---|
| 110,084 | Spence | Dec. 13, 1810 |
| 1,103,115 | Washburn | July 14, 1914 |
| 1,322,900 | Hart | Nov. 25, 1919 |
| 1,570,353 | Jacobson | Jan. 19, 1926 |
| 2,467,271 | Peer | Apr. 12, 1949 |
| 2,551,944 | Haff | May 8, 1951 |
| 2,600,813 | Tidwell | June 17, 1952 |
| 2,716,591 | Thomsen | Aug. 30, 1955 |